US006358484B1

(12) United States Patent
Sommers (10) Patent No.: US 6,358,484 B1
(45) Date of Patent: Mar. 19, 2002

(54) PROCESS FOR RECOVERY OF ZIRCONIUM BASIC SULFATE

(75) Inventor: James A. Sommers, Albany, OR (US)

(73) Assignee: ATI Properties, Inc., Albany, OR (US)

( * ) Notice: Subject to any disclaimer, the term of this patent is extended or adjusted under 35 U.S.C. 154(b) by 0 days.

(21) Appl. No.: 09/540,055

(22) Filed: Mar. 31, 2000

(51) Int. Cl.$^7$ .......................... C22B 34/00; C01B 17/96
(52) U.S. Cl. ........................................ 423/85; 423/544
(58) Field of Search .................................. 423/85, 544

(56) References Cited

U.S. PATENT DOCUMENTS

| 1,316,107 A |   | 9/1919 | Pugh |   |
|---|---|---|---|---|
| 1,376,161 A |   | 4/1921 | Pugh |   |
| 3,672,825 A | * | 6/1972 | Gambale et al. | ............ 423/544 |
| 5,264,123 A |   | 11/1993 | Bailey |   |
| 5,470,550 A | * | 11/1995 | Voit | ............................ 423/85 |

OTHER PUBLICATIONS

G. H. Beyer, et al., "Caustic Treatment of Zircon Sand", Inst. For Atomic Research and the Department of Chem. Engineering, Iowa State College (prior art), No date.

D. Offinger and D. Bailey, "Acid Recycling at a Captive Finishing Shop", *Products Finishing* (Dec. 1994). pp. 62–66.

Product brochure for "Pure Cycle Acid Recycling Systems" available from Pure Cycle Environmental Technologies, Inc., Palmer, MA (Prior art), No date.

* cited by examiner

*Primary Examiner*—Steven Bos
(74) *Attorney, Agent, or Firm*—P. J. Viccaro (57) ABSTRACT

A process for providing a zirconium basic sulfate includes providing a zirconium oxychloride solution, and then dialyzing the solution against a liquid selected from water and an aqueous solution across at least one anion exchange membrane to provide a dialyzate and diffusate. The dialyzate includes at least 90 percent of the zirconium ions of the zirconium oxychloride chloride solution and has a total acidity that is lower than the original zirconium oxychloride solution. A precipitate including zirconium basic sulfate may be formed from at least a portion of the diffusate. The zirconium oxychloride solution may be provided, for example, by dissolving zirconium tetrachloride in one of water and a hydrochloric acid solution. A material including zirconium basic sulfate produced by the process of the invention also is disclosed.

35 Claims, 2 Drawing Sheets

PROCESS FOR RECOVERY OF ZIRCONIUM BASIC SULFATE

CROSS REFERENCE TO RELATED APPLICATIONS

Not applicable.

STATEMENT REGARDING FEDERALLY SPONSORED RESEARCH OR DEVELOPMENT

Not applicable.

TECHNICAL FIELD AND INDUSTRIAL APPLICABILITY OF THE INVENTION

The present invention is directed to processes for producing zirconium basic sulfate. More particularly, the present invention is directed to processes for producing zirconium basic sulfate from a zirconium oxychloride solution. The present invention is additionally directed to materials that include zirconium basic sulfate. The invention finds application in, for example, the production of zirconium basic sulfate from zirconium metal, zirconium scrap, zirconium-containing ores, and other materials including zirconium in metallic or other forms.

DESCRIPTION OF THE INVENTION BACKGROUND

Zirconium sulfate, also called zirconium basic sulfate or "ZBS", is a key intermediate in the manufacture of zirconium chemicals from ores. It is currently a multi-million kilogram per year industry. The ores that are processed into ZBS are chiefly zircon, $ZrSiO_4$, and to a much lesser extent, baddeleyite, which is impure $ZrO_2$. The two most common means of opening the ores are caustic fusion and carbochlorination. These means are well known and are generally described in, for example, Kirk-Othmer Encyclopedia of Chemical Technology, Vol. 24, Third Edition, 1984, p. 863, the substance of which is hereby incorporated herein by reference. Carbochlorination utilizes zirconium tetrachloride as a source of zirconium ions in producing zirconium sulfate, but that process is disadvantaged, in terms of yield, relative to the caustic fusion process.

In the caustic fusion process, zircon ore is fused with sodium hydroxide, or in variations, with sodium carbonate or lime. The product of the fusion is called a "frit" and is contacted with water to dissolve and remove the silicon moiety as, for example, sodium silicate in the case where the ore is fused using sodium hydroxide. The leached frit is then dissolved in hydrochloric acid to yield a zirconium oxychloride solution. Because the stoichiometric ratio of zirconium oxychloride is two moles of hydrochloric acid for every mole of zirconium, there is little point in adding more hydrochloric acid than is necessary to dissolve the washed frit. Formation of zirconium oxychloride solution in this way is described in, for example, Beyer, et al., Ames Laboratory Report ISC 437 (Dec. 28, 1953), the substance of which is hereby incorporated herein by reference. A method for preparing a commercial ZBS from the zirconium oxychloride solution is described in, for example, U.S. Pat. No. 1,316,107, which also is incorporated herein by reference. A source of sulfate ions, such as sulfuric acid, is added to the zirconium oxychloride solution, and the mixture is then heated with stirring until a precipitate of ZBS forms. The mixture is allowed to digest for a period of time to allow substantially complete precipitation of ZBS as fine particles in the reaction vessel. The warm reaction mixture is filtered and washed to give a moist paste or cake of ZBS which is substantially free of all the metallic impurities that occur in the zirconium-containing ore. The filtrate contains zirconium ions that do not react to form product and, hence, are a yield loss.

In the alternate process for ZBS production, carbochlorination, zirconium values are typically first converted to zirconium tetrachloride by the high-temperature reaction of a mixture of zirconium-containing ore, a carbon source such as coke, and a chlorinating agent such as chlorine. In the case of zircon, this reaction produces substantially equimolar quantities of zirconium tetrachloride and silicon tetrachloride, $ZrCl_4$ and $SiCl_4$, respectively, as well as chlorides of many of the impurities present in the ore. Because silicon tetrachloride is a valuable product useful in, for example, producing fiber optic silica, carbochlorination makes use of the zirconium-containing ore's silicon content, which is merely discarded as a component of a waste sludge in the caustic fusion process. Zirconium tetrachloride is a fuming subliming solid and reacts vigorously and irreversibly with water to form a zirconium oxychloride solution. The zirconium oxychloride solution derived from the zirconium tetrachloride may then be reacted with sulfuric acid, as described above in connection with the caustic fusion process, to produce ZBS.

The amount of hydrochloric acid used to dissolve the leached frit in the caustic fusion process is the minimum amount required to allow the dissolution to occur in a convenient time period. In practice, this amount is that which meets any unneutralized caustic plus the stoichiometric ratio of 2HCl:1Zr, plus a further increment so that the dissolution will be suitably rapid. Ordinarily, this results in a HCl:Zr ratio somewhat larger than 2. Thus, zirconium oxychloride-containing solutions made for ZBS preparation via the caustic fusion process will have an acidity somewhat above 2 moles/liter of hydrogen ion concentration per mole/liter of zirconium. By contrast, zirconium oxychloride-containing solutions prepared from zirconium tetrachloride are found to have a HCl:Zr ratio of about 3.5 to 3.8, with a correspondingly higher acidity. When the higher acidity solutions are converted to ZBS (all other conditions of metal loading, sulfate:Zr ratio, reaction time, and temperature being kept constant), a lower yield of ZBS is obtained. Because zirconium ions lost to the filtrate during precipitation of ZBS are relatively dilute in a large volume of acid, they are not economically recoverable, and end up as a valueless sludge. Thus, the filtrate left upon separating the ZBS precipitate in carbochlorination contains a much higher quantity of unreacted zirconium ions than in the caustic fusion process and, consequently, the yield of ZBS is much lower in the carbochlorination process than in the caustic fusion process.

The carbochlorination process is well known and is disclosed in, for example, U.S. Pat. No. 1,376,161, the entire disclosure of which is hereby incorporated herein by reference. The '161 patent does not refer to the yield deficiency of that method. The caustic fusion process, on the other hand, although providing a higher yield of ZBS, does not provide a means to recover the silicon values from zirconium-containing ore, as in the carbochlorination process.

An alternative to the caustic fusion and carbochlorination processes is to react materials containing metallic zirconium with chlorine at high temperatures to recover zirconium from the materials as zirconium tetrachloride. A carbon source is not necessary in that process. The process, however, requires a starting material composed of or including zirconium metal, which excludes the use of, for example, zircon and baddeleyite ores. In addition, chlorination of metallic zirconium is highly exothermic and difficult to control.

Various means have been attempted to raise the yield of ZBS from zirconium tetrachloride. For example, it is known that it is possible to recoup lost yield from a zirconium tetrachloride solution by neutralizing some excess acidity. This may be accomplished by adding any of the basic reagents sodium hydroxide, sodium carbonate, or ammonia to the sulfate reaction mix. Adding such reagents increases cost and introduces undesirable foreign positive ions, such as sodium or ammonium, into the reaction mix. For most downstream applications of ZBS, the amounts of foreign positive ions retained in the ZBS cake are unacceptable. Furthermore, precipitations conducted under these more basic conditions risk co-precipitating metallic impurity ions, such as iron or aluminum ions.

It is also known in the art to increase yield in the ZBS precipitation step by forcing the precipitation or by lowering the mole ratio of sulfate to zirconium. For example, if ZBS is first made using a ratio of sulfate to zirconium of 3:5, a reaction similar in all other respects except using a ratio of 2:5 will provide a higher ZBS yield. It also is known to increase ZBS precipitation yield by adding a large volume of cold water in the latter stages of the precipitation reaction. However, products produced by modifying the ZBS precipitation reaction in these ways are often unreactive in downstream reactions. As used herein, the "reactivity" of a ZBS precipitate refers to the ability of the precipitate to dissolve rapidly and completely under mild conditions to give a clear solution. Only a small population of unreactive particles in the precipitate will result in a turbid solution, which may be unacceptable for subsequent reaction steps. The reasons for the unreactive nature of such ZBS precipitation products are not well understood, but it is theorized that the ZBS particle surface functionalization or particle morphology may be adversely affected by the steps taken to modify the precipitation reaction.

Thus, several drawbacks are associated with known processes for forming ZBS from zirconium oxychloride solutions and from zirconium metal and zirconium-containing materials.

Accordingly, the need exists for a process for providing ZBS from zirconium metal and zirconium-containing materials which improves upon the yield of the above conventional processes, while also providing a ZBS product that will retain reactivity for use in subsequent reactions.

The need also exists for a process for providing ZBS from zirconium metal and zirconium-containing materials and by which the zirconium values of a zirconium oxychloride solution may be captured in high yield and with high purity.

In addition, the need exists for a process for providing ZBS from zirconium oxychloride solutions, zirconium metal, and zirconium-containing materials in high yields and without need for the addition of sodium hydroxide, sodium carbonate, ammonia, or other chemicals which may adversely affect the purity of the ZBS product.

BRIEF SUMMARY OF THE INVENTION

In order to address the above-described needs, the present invention is directed to a process for providing a ZBS wherein a zirconium oxychloride solution is provided and is then dialyzed against a liquid selected from water and an aqueous solution across at least one anion exchange membrane. The dialysis produces a dialyzate and diffusate, which may be separately collected. The dialyzate retains at least 90 percent of the zirconium ions of the zirconium oxychloride solution and is at a lower total acidity than the zirconium oxychloride solution. A precipitate that includes ZBS may be formed from at least a portion of the diffusate produced in the dialysis.

The zirconium oxychloride solution may be provided by any known process. In one embodiment of the process of the present invention, the zirconium oxychloride solution is provided by first providing a solid zirconium tetrachloride and then dissolving the solid zirconium tetrachloride in one of water and a hydrochloric acid solution. The solid zirconium tetrachloride may be obtained as a reagent or provided by any known process such as, for example, chlorinating zirconium metal or a zirconium-containing material to provide a chlorinated material that includes zirconium tetrachloride. The zirconium-containing material may be any material suitable for the formation of ZBS such as, for example, zircon, baddeleyite, oxide materials including zirconium, and materials including zirconium metal.

The process of the present invention also is directed to producing ZBS by recovering a solid zirconium tetrachloride from zirconium metal or a zirconium-containing material, and then dissolving the solid zirconium tetrachloride in one of water and a hydrochloric acid solution to provide a zirconium oxychloride solution. The zirconium oxychloride solution is dialyzed against water across an anion exchange membrane to provide a dialyzate and a diffusate. The dialyzate includes at least 90 percent of the zirconium ions of the dialyzed zirconium oxychloride solution, and the total acidity of the diffusate is greater than the water used in the dialysis. At least a portion of the dialyzate is combined with one of sulfuric acid and a sulfuric acid solution, and the resulting mixture is heated to form a precipitate that includes solid ZBS.

The present invention also is directed to a material composed wholly or partially of ZBS and which is formed by a process of the present invention.

As used in the present description of the invention, the terms "solution, "water", and "total acidity" have the following meaning. The term "solution" is used herein to refer to, for example, zirconium oxychloride solution, hydrochloric acid solution, and sulfuric acid solution. In that context, "solution" refers to pure forms of those solutions, as well as forms including acceptable minor levels of solids and other solutes solvents, whether intended or present as impurities. For example, iron, aluminum, and titanium are commonly present as impurities in zirconium oxychloride solutions, and minor amounts of those impurities do not significantly affect the quality of ZBS that is produced from the solutions. The term "water" refers to pure water or water including acceptable minor amounts of dissolved and solid impurities. It is contemplated, for example, that in conducting the process of the invention waste water from a tank used in the process, or recycled water from another step in the process, may be used and may include insignificant amounts of impurities. The term "total acidity", also referred to herein as "TA", refers to the concentration of hydrogen ions and acidic anions in a solution, and is determined by titrating the solution with sodium hydroxide to the phenophthalein end point. Thus, total acidity typically is expressed in units of moles per liter.

The process of the present invention allows for reduction in the total acidity of a zirconium oxychloride solution without a significant reduction in the zirconium content of the solution. For example, the inventor has determined that a process carried out according to the invention can result in less than 1 percent of the zirconium ions being lost to the diffusate during the dialysis using a conventional anion exchange membrane. The reduction in the total acidity of the zirconium oxychloride solution allows for the formation of ZBS with high yield. The dialysis also may reduce the content of ions of other metals within the zirconium oxychloride solution, enhancing the purity of the ZBS. Because the process of the invention does not require the addition of reagents to the zirconium oxychloride solution to adjust the total acidity of the solution or to force the equilibrium of the ZBS precipitation reaction, no impurities are introduced into the ZBS product.

These and other advantages of the process and product of the present invention will be apparent on consideration of the following detailed description of embodiments of the invention.

BRIEF DESCRIPTION OF THE DRAWINGS

The features and advantages of the present invention may be better understood by reference to the accompanying drawings in which.

DETAILED DESCRIPTION OF EMBODIMENTS OF THE INVENTION

The present invention is directed to a novel process for providing a zirconium basic sulfate (ZBS) from a zirconium oxychloride solution. In one embodiment of the process of the present invention, a solution including zirconium oxychloride is provided and then is subjected to diffusion dialysis against water or a suitable aqueous solution across an anion exchange membrane that is substantially impermeable to zirconium ions, but that is relatively permeable to acid anions and hydrogen ions. By "substantially impermeable" is meant that less than 10 percent, and preferably less than 1 percent, of the zirconium ions will diffuse from the zirconium oxychloride solution across the anion exchange membrane under the conditions of the dialysis. Hydrogen ions and readily diffusable acid anions in the zirconium oxychloride solution may diffuse across the membrane and enter the water or aqueous solution during the dialysis, while the zirconium ions do not readily diffuse through the membrane. The dialysis incorporated in the present embodiment may provide, to one side of the anion exchange membrane, a dialyzate including substantially all (at least 90 percent, and preferably at least 99 percent) of the zirconium ions of the zirconium oxychloride solution and having lower total acidity than the original zirconium oxychloride solution. The solution collected to the other side of the anion exchange membrane upon dialysis is a diffusate having an increased total acidity relative to the original liquid. Thus, the dialysis has the effect of lowering the total acidity of the original zirconium oxychloride solution without any significant loss of the zirconium values of the solution to the diffusate.

The dialyzate is further processed to provide ZBS. One technique that may be used in the present invention for recovering zirconium values as ZBS from the dialyzate is to mix sulfuric acid or a sulfuric acid solution with the dialyzate and heat the mixture with stirring until precipitation of ZBS is complete. Preferably, the molar ratio of zirconium in the dialyzate to sulfuric acid is from 1.4 up to 2.0. The ZBS precipitate may then be recovered in purer form as, for example, a cake or paste, by filtering and washing the precipitate. It is believed that to optimize the recovery of ZBS from the dialyzate when adding sulfuric acid or a sulfuric acid solution to the dialyzate, the molar ratio of zirconium in the dialyzate to sulfuric acid preferably should be in the range of from 1.4 up to 2. Other suitable techniques for recovering ZBS from zirconium oxychloride solution, and suitable techniques for enhancing ZBS recovery from the solution, will be apparent to those of ordinary skill upon considering the present description of the invention. All such other techniques are intended to be encompassed herein.

The zirconium oxychloride solution used in the process of the present invention may be provided as a reagent or may be produced by any suitable method. Such methods include, for example, the methods of zirconium oxychloride formation utilized in the caustic fusion process and the carbochlorination process described in the above-cited '107 and '161 patents, respectively.

One method for producing a zirconium oxychloride solution that may be used in the present process includes providing zirconium tetrachloride in solid form, and then dissolving the solid zirconium tetrachloride in one of water and a hydrochloric acid solution to provide the zirconium oxychloride solution. The zirconium tetrachloride may be provided by chlorinating one or more zirconium-containing materials such as, for example, zircon ($ZrSiO_4$), baddeleyite (impure $ZrO_2$), or an oxide including zirconium, to provide a chlorinated material that includes zirconium tetrachloride ($ZrCl_4$), and may also include silicon tetrachloride ($SiCl_4$) and other chloride compounds. The carbon source used in the carbochlorination may be, for example, one or more of coke, graphite, coal, or any other carbonaceous material suitable as a reductant in the chlorination reaction. The chlorinating agent that may be used may include one or more of chlorine gas, phosgene, carbon tetrachloride, other chlorinated hydrocarbons, and any other suitable compound including carbon and chlorine. Other suitable carbon sources and chlorinating compounds will be apparent to those of ordinary skill upon considering the present description of embodiments of the invention.

In one particular carbochlorination method, zirconium tetrachloride is formed by combining crushed zirconium-containing ore with a carbon source material, such as coke, and the mixture is heated at a temperature of at least 700° C. while a stream of chlorine gas is passed over the mixture. A carbon source is unnecessary when chlorinating zirconium metal or a material including zirconium metal. When, for example, a zirconium-containing ore such as zircon is subjected to carbochlorination, zirconium tetrachloride and silicon tetrachloride are produced and may be separately recovered in enriched or substantially pure forms by purification methods within the ordinary skill of practitioners in the art. As an example, differences in the sublimation temperature of zirconium tetrachloride and the other components of the gaseous chlorinated reaction mixture may be utilized to separate the materials by differential condensation. Condensers downstream of the chlorinators are maintained at a temperature at which the zirconium tetrachloride condenses and at which other components of the reaction mixture, such as chlorine and silicon tetrachloride, are gassed off.

A caustic fusion method for producing a zirconium oxychloride solution useful in the present process may include the steps of fusing any of the zirconium-containing materials set forth above with at least one of sodium hydroxide, sodium carbonate, and lime to form a frit that is then contacted with water to leach silicon from the frit. A zirconium oxychloride solution is produced by dissolving the leached frit in hydrochloric acid.

Other methods of providing a zirconium oxychloride solution will be apparent to those of ordinary skill. The fact that only a limited number of such methods are discussed herein is not intended to limit the scope of the present invention.

In a typical diffusion dialysis process, an acidic, metal-bearing aqueous stream flows into a chamber divided by a semipermeable membrane from a water stream that inflows simultaneously. The various species present in the acidic aqueous solution migrate through the membrane at different rates. In the case of anion exchange type membranes, acid anions and hydrogen ions in the acidic aqueous solution readily pass through the membrane into the water, whereas metal ions pass through the membrane more slowly. Anion exchange membranes are well known, although they have not been used as contemplated by the present invention. The mode of operation of anion exchange membranes, as well as possible constructions of dialysis devices including those membranes, are described in, for example, U.S. Pat. No. 5,264,123 and in Offinger and Bailey, "Acid Recycling at a Captive Finishing Shop", *Products Finishing,* (December 1994), pages 62–66, the disclosures of which are hereby incorporated herein by reference.

Figure 1:
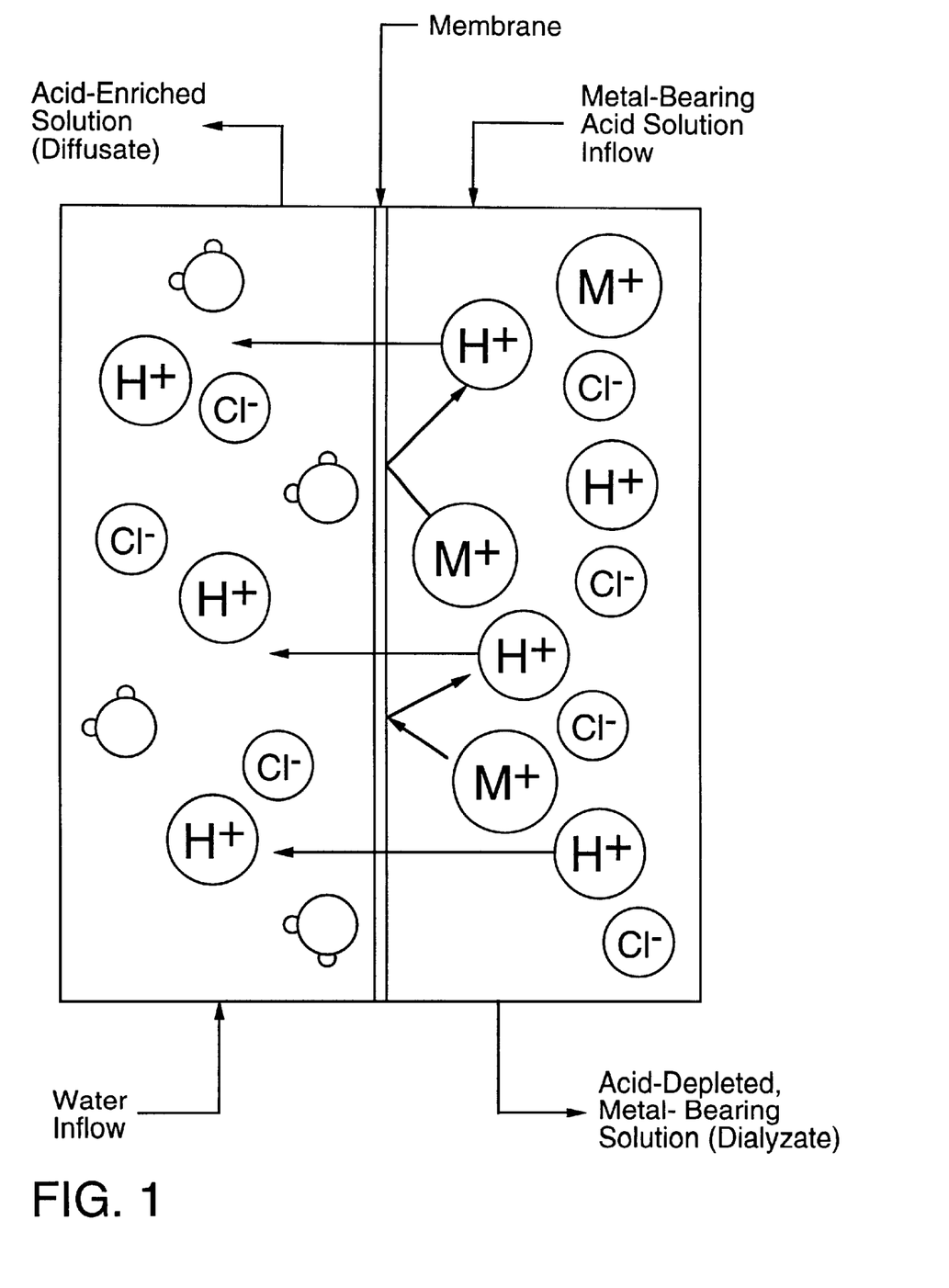
FIG. 1 is a representation of the dialysis of a metal-containing acidic solution against water across an anion exchange membrane.

Anion exchange membranes are selectively permeable membranes that have been chemically modified to include anion exchange functionality so as to exhibit a strong affinity for acid absorption and a greatly reduced affinity for salt absorption. Because ion charge neutrality must be maintained on both sides of the membrane, either anions must diffuse through the membrane at a rate in both directions that preserves charge neutrality, or each anion that diffuses through the membrane must be accompanied by a cation. As illustrated in FIG. 1, the hydrogen ions in an acidic metal-bearing solution brought in contact with an anion exchange membrane are extremely small in physical size and readily migrate through the selectively permeable membrane. To preserve ion charge neutrality, each hydrogen ion migrates in conjunction with a cation such as, for example, chloride, fluoride, nitrate, phosphate, or sulfate, present in the acidic aqueous solution. Metal ions, which are comparatively large, do not readily associate and diffuse along with the diffusing anions. This results in an acid depleted, metal-bearing solution (dialyzate) and an acid-enriched solution (diffusate).

The one or more anion exchange membranes of a diffusion dialysis apparatus that may be utilized in the present process must be substantially impermeable to the diffusion of zirconium ions, while being relatively permeable to the diffusion of acid anions and hydrogen ions. Membrane materials known to be suitable for anion exchange diffusion dialysis generally include, for example, acetals, acrylics, cellulosics, fluoroplastics, ketone-based resins, nitriles, nylons, phenolics, polyamides and polyimides, polyarylates, polybenzimidazoles, polybutylenes, polycarbonates, polyesters, polybutylene terephthalates, polycyclohexylene-dimethylene terephthalates, polyethylene terephthalates, polyethermides, polyethylenes (including ethylene acid copolymers, ethylene-ethyl acrylates, ethylene-methyl acrylates, ethylene-vinyl acetates, and ethylene-vinyl alcohol copolymers), polyimides, polymethylpentenes, polyphenylene oxides, polyphenylene sulfides, polyphthalamides, polypropylenes, polyurethanes, silicones, styrenics (including ABS, ACS, acrylic-styrene-acrylonitriles, polystyrenes, styrene-acrylonitriles (SAN), olefin-modified SAN, styrene-butadiene copolymers, and styrene-maleic anhydrides), sulfone-based resins (including polyarylsulfones, polyethersulfones, and polysulfones), thermoplastic elastomers (including styrenic block copolymers, polyolefin blends (TPOS), elastomeric alloys, thermoplastic polyurethanes (TPUS), thermoplastic copolyesters, and thermoplastic polyamides), and vinyl-based resins (including chlorinated polyvinyl chlorides (CPVC), polyvinyl chlorides (PVC), vinylidene chlorides (PVDC)). Other materials suitable as anion exchange membranes will be apparent to one of ordinary skill upon considering the present description of embodiments of the invention. One of ordinary skill in the art may readily ascertain whether a membrane composed of any particular material has the requisite impermeability to zirconium ions and relative permeability to hydrogen ions and acid anions utilized in the process of the present invention.

The diffusion dialysis apparatus system utilized in the process of the present invention may include one or multiple individual anion exchange membranes. In multiple membrane systems, the membranes may be arranged horizontally or vertically, in parallel or in series, or in any other suitable arrangement. More specific multiple membrane systems that may be used include parallel counter-current flow systems and series counter-current flow systems. Vertically arranged parallel counter-current flow systems utilize a variable number of identical water flow cells matched with an equal number of acid solution flow cells, with solutions flowing simultaneously and unidirectionally in all cells. A water flow cell and a solution flow cell are separated by an anion exchange membrane to form an individual membrane chamber. All acid flow cells share a common inlet and a common outlet, and similarly, all water flow cells share a common inlet and outlet, thereby establishing a parallel flow of solution and water streams through the chambers. Horizontal parallel counter-current flow systems also exist, wherein the individual chambers are arranged in a stack and are plumbed in a fashion identical to series parallel counter-current flow systems. A dialysis "stack" refers to an assemblage of membrane chambers, and is typically provided with suitable accessories such as storage tanks, pumps and the like.

Series counter-current flow systems utilize horizontal solution flow cells that are vertically arranged in a stack and are plumbed in series. One inlet and one outlet is provided for each solution introduced into the system, and the inlets and outlets are not common to all similar flow cells. Instead, flow is interconnected within the membrane stack. Thus, in the series counter-current flow designs, as solution exits one cell it is routed to an adjoining cell, where it is then redirected 180 degrees back across yet another new membrane. In contrast, in a parallel flow design the solution exits the membrane stack when it exits a cell. A series counter-current flow membrane stack having dimensions similar to a parallel counter-current flow membrane stack can posses thousands of times the effective membrane length, better ensuring that maximum diffusion efficiency is obtained.

Preferably, the diffusion dialysis system used in the present process is of the counter-current flow type. Thus, a flow of zirconium oxychloride solution to be dialyzed is passed in one direction along the anion exchange membrane, while a flow of water or an appropriate aqueous solution is passed in an opposite direction along the other side of the membrane. Because the driving force of diffusion dialysis is the concentration gradient across the anion exchange membrane, counter-current flow is employed to maximize the gradient potential. Upon entering a dialysis cell, fresh water comes in contact with the membrane area which has the lowest concentration of hydrogen ions and acid anions on its other side, as those ions have been depleted from the acid solution by diffusion while flowing through the cell and are now exiting the cell. Although the exiting acid solution may be depleted in acid ions, there still remains a driving force for additional diffusion of hydrogen ions and acid anions because the water on the other side of that region of the membrane is fresh and relatively acid free. Thus, to maximize the diffusion driving force, as the water flows from inlet to outlet in one direction, the solution flows in the opposite, counter-current direction.

Other diffusion dialysis systems will be apparent to those of ordinary skill in the art. Such persons may readily ascertain whether any particular system may be applied in the present process, and it will be understood that the present process is not limited only to use of the diffusion dialysis systems mentioned herein. Diffusion dialysis systems are readily commercially available as off-the-shelf components that may be applied in the present process. For example, certain series counter-current flow diffusion dialysis systems that may be used in the present process are available from Pure Cycle Environmental Technologies, Inc., Palmer, Massachusetts, and are described in U.S. Pat. No. 5,264,123.

The performance metric for diffusion dialysis systems is typically expressed as the volume per unit time which can be processed to the desired condition in one or both of the exit streams per unit area of membrane. A common unit is liters/square meter of membrane/hour. When dialyzing zirconium oxychloride solution against water in the process of the present invention, for example, it is preferred that the dialysis rate be in the range of from 2.5 up to 4.5 liters of dialyzate per square meter of membrane per hour ($1/m^2/hr$). In general, as the dialysis rate slows, more acid will be removed from the dialyzate. Removing too much acid from the zirconium oxychloride solution is tantamount to adding base to the solution, which may adversely affect the reactivity of the ZBS. In addition, slower dialysis rates necessarily require a greater capital expenditure in diffusion dialysis equipment to treat a given volume of zirconium oxychloride solution per day. For those reasons, the lower rate limit of 2.5 liters of dialyzate per square meter of membrane per hour is preferred. Rates of $3.01/m^2/hr$ and $3.51/m^2/hr$, respectively, are the more preferred and most preferred lower rate limits when dialyzing the solution against water. The mechanical limits of the dialysis system will be reached at high flow rates, and it is possible that one may hydraulically over-pressurize and damage an anion exchange membrane. The upper rate limit of $4.51/m^2/hr$ is preferred based on the capabilities of the current generation of commercially available equipment that may be used to dialyze zirconium oxychloride solution against water. To balance throughput with quality of product, an upper rate limit of $4.0 \, 1m^2/hr$ is more preferred.

The sum of the concentration of $ZrO_2$ and $HfO_2$ in a zirconium oxychloride solution is referred to as $(Zr+Hf)O_2$, or simply as $MO_2$. Hafnium is typically present in zirconium oxychloride solutions produced from zirconium-containing ores and, as is known in the art, about 2% of the $MO_2$ of such a solution is $HfO_2$. The ratio of the $MO_2$ of the dialyzate to the total acidity (TA) in the dialyzate, $TA/MO_2$, both measured in moles per liter, preferably is in the range of from 2.2 up to 3.2, and more preferably is about 2.8. When determining whether the dialysis rate of a particular diffusion dialysis system is within the preferred ranges discussed above, the dialyzate must have a $TA/MO_2$ within the 2.2 to 3.2 preferred range and the dialysis is performed against water.

Preferably, zirconium oxychloride solution dialyzed according to the present invention include from 30 up to 350 grams/liter of zirconium oxychloride. Current processing costs do not justify treating solutions less concentrated than 30 grams/liter, although future changes in the economics of ZBS production could justify treatment of more dilute solutions. The solubility limit of zirconium oxychloride in water is approached as the concentration of the solution exceeds 350 grams/liter.

Figure 2:
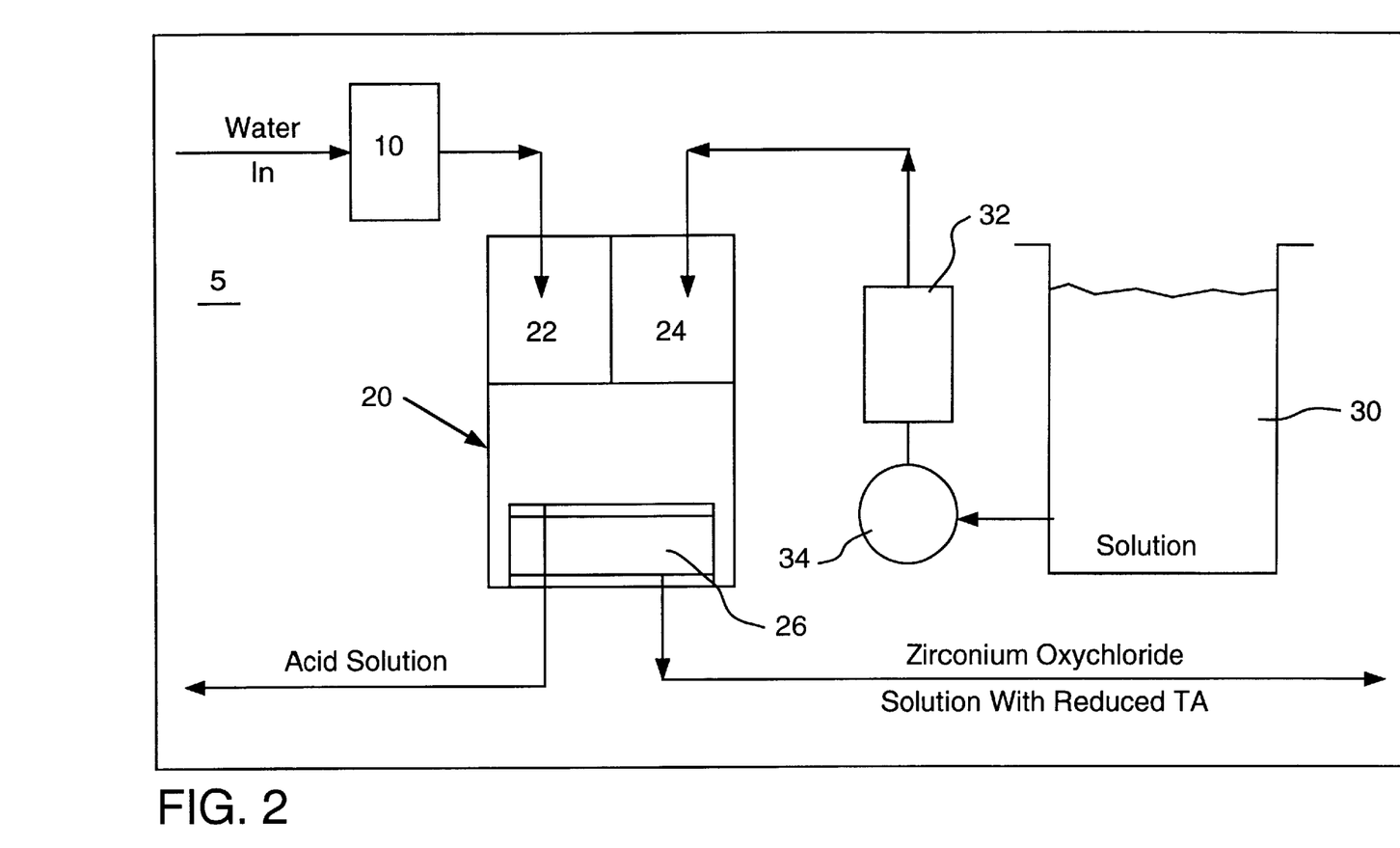
FIG. 2 is a schematic representation of one manner of conducting the dialysis technique of the process of the present invention.

FIG. 2 is a schematic representation of one manner of adapting a series counter-current flow dialysis system to the present process. In FIG. 2, water enters the dialysis system 5 and passes through a filter 10 to remove particulate matter and other undesirable impurities. The filtered water then enters the dialysis module 20 and fills water tank 22. A zirconium oxychloride solution in tank 30 is pumped through filter 32 by pump 34 and enters solution tank 24 of the dialysis module 20. The filtered water and filtered zirconium oxychloride solution are then dialyzed in dialysis stack 26, resulting in a diffusate that is an acid solution including hydrogen ions and acidic anions that have diffused from the zirconium oxychloride solution into the water. A dialyzate that is a zirconium oxychloride solution with reduced total acidity also is produced.

In one embodiment of the process for operating the dialysis system 5 shown in FIG. 2, the inflow rates of water and zirconium oxychloride solution into the dialysis stack 26 may be about 0.5 gallons per minute and about 1 gallon per minute, respectively. The outflow rates from the dialysis stack 26 of diffusate and dialyzate may be 0.5 gallons per minute and 1 gallon per minute, respectively, in order to match the respective inflow rates. Preferably, the total acidity of the zirconium oxychloride solution fed to the dialysis stack 26 is in the range of 3.0 up to 6.0 moles/liter, and more preferably is about 4.8 moles per liter. The total acidity of the dialyzate preferably is in the range of 3.0 up to 4.0 moles/liter, and more preferably is about 3.6. In order to preserve the acid balance of the system, the total acidity of the diffusate preferably is in the range of 1.0 up to 3.0 moles/liter, and more preferably is about 2.4 moles per liter under the foregoing operating conditions for the system 5. Operating the system 5 of FIG. 2 at zirconium oxychloride solution and water inflow rates that differ from 1.0 and 0.5 gallons per minute, respectively, will shift the total acidity of the dialyzate and diffusate.

The foregoing operating parameters are offered by way of example only, and it will be apparent that those parameters may be varied while still providing a dialyzate useful for producing ZBS in a downstream step.

Although anion exchange membranes are relatively impermeable to metal ions, "leakage" of metal ions through the membranes does occur. In conventional dialysis processes utilizing anion exchange membranes, the extent of leakage and the rate of the desired acid recovery both vary with solution flow rate, and a balance of leakage and product recovery is sought through control of the inflow rates. An unexpected finding of the inventor when evaluating the process of the present invention is that the dialysis of a zirconium oxychloride solution using an anionic exchange membrane effectively lowers the acidity of the solution without any significant loss or leakage of zirconium values to the diffusate. The inventor has discovered that in the case of zirconium ions, the rate of leakage through anion exchange membranes evaluated by the inventor is so extremely slow that the membrane may be considered essentially impermeable to the ions. That finding is unexpected in light of leakage data based on the diffusion dialysis of other metal-bearing acid solutions. The data of Offinger and Bailey, for example, shows that in recovery of a pickle acid by diffusion dialysis using an anion exchange membrane, it is common to find that 6 to 12 percent of the metal values diffuse across the membrane to the diffusate stream. Such losses would be commercially unacceptable for recovery of zirconium, where even 2 percent losses would likely make the process uneconomical under the current conditions of the market for ZBS. The inventor has found that even when using highly concentrated (for example, 180 grams/liter) zirconium oxychloride solutions, only about 0.1 percent of zirconium values are diffused through the anion exchange membranes evaluated into the diffusate stream when dialyzing against water. This amounts to only one zirconium ion in one thousand, which is substantially less than the typical diffusion dialysis metal ion leakage rate of about 1 in 10 for other metals.

The rate of loss of zirconium values in the diffusion dialysis technique utilized in the present invention also is much lower than the yield losses incurred in the prior art caustic fusion and carbochlorination methods of ZBS formation according to the Pugh '107 and '161 patents. Preferably, the dialyzate achieved in the process of the present invention includes at least 99 percent of the zirconium ions of the original zirconium oxychloride solution.

A preferred embodiment of the process of the invention includes the following steps:

a. Chlorinating a zirconium-containing material such as, for example, crushed zircon or baddeleyite;

b. Differentially condensing the chlorinated product to recover solid zirconium tetrachloride substantially free of contaminants, and to separately recover silicon values from the chlorinated product as silicon tetrachloride;

c. Dissolving the purified solid zirconium tetrachloride in water or a dilute solution containing hydrochloric acid to provide an aqueous zirconium oxychloride solution;

d. Dialyzing a stream of the zirconium oxychloride solution against a water stream across an anion exchange membrane and separately collecting a dialyzate stream and a diffusate stream, wherein the dialyzate is a zirconium-rich stream containing substantially all of the zirconium values of the original zirconium oxychloride stream at a lower acidity than the original zirconium oxychloride stream, and wherein the diffusate is a dilute hydrochloric acid stream which includes less than 1 percent of the zirconium ions in the original zirconium oxychloride solution;

e. Using the dialyzate stream as the zirconium feed source to a ZBS reaction by mixing the stream with a solution of sulfuric acid, heating, and stirring until the ZBS precipitation reaction is complete; and f. Filtering and washing the precipitate to recover the ZBS product as a moist paste or cake.

Actual examples of the process of the present invention follow.

EXAMPLE 1

A Type T-OB Selemion® Dialyzer (Asahi Glass Company Ltd.), including thirteen individual anion exchange membranes plumbed in parallel and composed of polystyrene/divinylbenzene copolymer, was fed from standpipes supplied with 1000 ml/hr of zirconium oxychloride solution to the dialyzate side of the membranes and 500 ml/hr of distilled water to the diffusate side of the membranes. The zirconium oxychloride solution was prepared by dissolving in distilled water crude zirconium tetrachloride produced from carbochlorination of zircon. The zirconium oxychloride solution flowing into the dialysis stack (the "head" sample) had $MO_2$ equal to 178 g/liter and a total acidity of 5.02 moles/liter. After allowing the dialysis to occur for one hour, a dialyzate sample flowing out of the membrane stack had $MO_2$ of 178 g/liter and a total acidity of 3.65 moles/liter, while a sample of the diffusate had 43 mg/liter of zirconium and a total acidity of 2.7 moles/liter. Thus, the total acidity of the zirconium oxychloride solution was substantially lowered with a loss of only about 0.03 weight percent of the zirconium. The dialyzate stream may be treated to extract the zirconium values as ZBS. Also, for many practical applications, the diffusate, without any further treatment, may be considered of high purity.

EXAMPLE 2

The dialysis system used in Example 1 was fed a zirconium oxychloride solution to the dialyzate side of the membranes at about 880 ml/hr and distilled water to the diffusate side of the membranes at about 430 ml/hr. The zirconium oxychloride solution was prepared as described in Example 1 and had $MO_2$ of 168 g/liter and total acidity of 5.04 moles/liter. The dialysis stack was allowed to run overnight, and the dialyzate and diffusate streams were then tested. The dialyzate had an $MO_2$ of 168 g/liter and total acidity of 3.69 moles/liter, while the diffusate had a total acidity of 2.46 moles/liter. Although minor adjustments were made to the solution and water inflow rates while the dialysis stack ran, an effort was not made to collect separate fractions of dialyzate and diffusate corresponding to each minor rate change, and the $MO_2$ and TA values were determined from blended samples. Boildown and ignition of 250 ml of diffusate yielded only 0.03 g of material. The dialysis substantially decreased the total acidity of the zirconium oxychloride solution, while not significantly reducing the zirconium concentration of the solution.

Aliquots of 955 ml each of the head and dialyzate samples were further tested as follows. To each aliquot was added to 2800 ml of water and then 190 ml of 4.17 N $H_2SO_4$. The mixture was heated with stirring for a period of two hours during which time precipitation of ZBS occurred. For the final hour, the mixture was kept above 95° C. The mixture was vacuum filtered hot and washed with a small amount of cold water. The filtrate from precipitation of the head sample was found to have 18.8 g/liter $MO_2$, while the filtrate from precipitation of the dialyzate was found to have 5.15 g/liter $MO_2$. This comparison is a direct measure of the yield benefits of the diffusion dialysis. Thus, the dialysis substantially increased the portion of the zirconium values in the zirconium oxychloride solution extracted as ZBS precipitate.

EXAMPLE 3

An A-125 diffusion dialysis stack was obtained from Pure Cycle Environmental Technologies. The dialysis stack is a series counter-current design including eighteen anion exchange membrane pairs of polystyrene/divinylbenzene copolymer having a total membrane area of 5.76 $m^2$. The stack was operated at several dialyzate and diffusate flow rates, with suitable line out time allowed between changes of conditions. The TA/MO$_2$ ratio of the zirconium oxychloride solution was about 3.6, and the TA/MO$_2$ was also measured for samples of the dialyzate collected at the various flow rates. The several dialyzate samples were used as feed to ZBS reactions of the type described in Example 2. The results are provided in the Table 1 below.

TABLE 1

| Flow (ml/min) | | ZBS yield | Dialyzate |
|---|---|---|---|
| Dialyzate | Diffusate | (weight %) | TA/MO$_2$ |
| 230 | 226 | 96 | 2.08 |
| 275 | 220 | 96 | 2.17 |
| 304 | 222 | 95 | 2.47 |
| 341 | 220 | 95 | 2.54 |
| 381 | 225 | 95 | 2.56 |

EXAMPLE 4

A production scale dialysis run was carried out using the diffusion dialysis system of Example 3 to produce 3000 gallons of dialyzate at a rate of about 150 gallon/day. As with each of the previous examples, the zirconium oxychloride solution was prepared by dissolving in distilled water a crude zirconium tetrachloride produced form carbochlorination of zircon. The solution had MO$_2$ of about 170 grams/liter. ZBS was made (by precipitation with sulfuric acid solution) from the dialyzed zirconium oxychloride solution feed and also from zirconium oxychloride solution feed that had not undergone dialysis (the control). The dialyzed and non-dialyzed zirconium oxychloride solution feeds were assayed for MO$_2$, as were the product ZBS cakes and filtrates, thereby allowing ZBS yield, loss, and mass balance (accountability) to be measured. The results are provided in Table 2 below.

TABLE 2

| | Control run | Test run |
|---|---|---|
| MO$_2$ in the zirconium oxychloride solution feed (pounds) | 4056 | 4436 |
| MO$_2$ in the precipitated product (pounds) | 3198 | 4017 |
| MO$_2$ in the precipitation filtrate (pounds) | 773 | 266 |
| Yield (weight %) | 79 | 91 |
| Accountability (%) | 98 | 97 |

Thus, the ZBS yield was substantially enhanced by applying the dialysis process to the zirconium oxychloride solution. It is believed that the dialysis effectively reduced the total acidity of the zirconium oxide feed to the ZBS precipitation reaction, while not substantially reducing the zirconium content of the feed stream.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, those of ordinary skill in the art will, upon considering the foregoing description, recognize that many modifications and variations of the invention may be employed. All such variations and modifications of the invention are intended to be covered by the foregoing description and the following claims.

I claim:
1. A process for providing a zirconium basic sulfate, the process comprising:
providing a zirconium oxychloride solution;
dialyzing the zirconium oxychloride solution against a liquid selected from the group consisting of water and an aqueous solution across at least one anion exchange membrane to provide a dialyzate and a diffusate, the dialyzate including at least 90 percent of the zirconium ions of the zirconium oxychloride solution and having lower total acidity than the zirconium oxychloride solution, the diffusate having an increased acidity relative to the liquid; and
forming a precipitate comprising a zirconium basic sulfate from at least a portion of the diffusate.

2. The process of claim 1, wherein the dialyzate includes at least 99 percent of the zirconium ions of the zirconium oxychloride solution.

3. The process of claim 1, wherein providing a zirconium oxychloride solution comprises:
providing a solid zirconium tetrachloride; and
dissolving the solid zirconium tetrachloride in one of water and a hydrochloric acid solution.

4. The process of claim 3, wherein providing a solid zirconium tetrachloride comprises:
chlorinating a zirconium-containing material to provide a chlorinated material comprising zirconium tetrachloride and at least one additional chloride compound; and
purifying the chlorinated material to provide a material enriched in zirconium tetrachloride.

5. The process of claim 4, wherein the zirconium-containing material is at least one material selected from the group consisting of zircon, baddeleyite, an oxide material including zirconium, zirconium metal, and a material including zirconium metal.

6. The process of claim 4, wherein chlorinating a zirconium-containing material comprises:
reacting a mixture of the zirconium-containing material, a carbon source, and a chlorinating agent at high temperature.

7. The process of claim 6, wherein the zirconium-containing material is selected from the group consisting of zircon, baddeleyite, and an oxide material including zirconium.

8. The process of claim 6, wherein the carbon source is at least one material selected from the group consisting of coke, graphite, coal, and a carbonaceous material.

9. The process of claim 4, wherein chlorinating a zirconium-containing material comprises:
reacting at least one zirconium-containing material selected from the group consisting of zirconium metal and a material including zirconium metal with a chlorinating agent at high temperature.

10. The process of claim 6, wherein the chlorinating agent is at least one material selected from the group consisting of chlorine gas, carbon tetrachloride, phosgene, and a chlorinated hydrocarbon.

11. The process of claim 4, wherein chlorinating a zirconium-containing material comprises:
providing a mixture comprising the zirconium-containing material and a carbon source material; and
contacting the mixture with a flow of chlorine gas while maintaining the mixture at a temperature of at least 700° C.

12. The process of claim 3, wherein providing a solid zirconium tetrachloride comprises:

reacting a mixture of a zirconium-bearing material, a carbon source material, and a chlorinating agent to provide a chlorinated material comprising zirconium tetrachloride and silicon tetrachloride; and recovering substantially pure zirconium tetrachloride from the chlorinated material.

13. The process of claim 12, further comprising:

recovering from the chlorinated material a material enriched in silicon tetrachloride.

14. The process of claim 1, wherein forming a precipitate comprising zirconium basic sulfate comprises:

adding at least one of sulfuric acid and a sulfuric acid solution to the dialyzate and heating the dialyzate above room temperature.

15. The process of claim 14, wherein in adding at least one of sulfuric acid and a sulfuric acid solution, the molar ratio of zirconium in the dialyzate to sulfuric acid is in the range of from 1.4 up to 2.

16. The process of claim 1, wherein the anion exchange membrane is substantially impermeable to diffusion of zirconium ions and relatively permeable to diffusion of acid anions and hydrogen ions during dialysis.

17. The process of claim 1, wherein dialyzing the zirconium oxychloride solution comprises:

dialyzing the zirconium oxychloride solution against water across the at least one anion exchange membrane to provide the dialyzate and the diffusate.

18. The process of claim 1, wherein the total acidity of the zirconium oxychloride solution is in the range of from 3.0 up to 6.0 moles/liter, the total acidity of the dialyzate is in the range of from 3.0 up to 4.0 moles/liter, and the total acidity of the diffusate is in the range of from 1.0 up to 3.0 moles/liter.

19. The process of claim 18, wherein the total acidity of the zirconium oxychloride solution is about 4.8, the total acidity of the dialyzate is about 3.6, and the total acidity of the diffusate is about 2.4, all in moles/liter.

20. The process of claim 1, wherein a stream of the zirconium oxychloride solution is passed against one surface of the anion exchange membrane and is transformed by diffusion dialysis into a stream of the dialyzate, and further wherein a stream of one of water and an aqueous solution is passed against a second surface of the anion exchange membrane and is transformed by diffusion dialysis into a stream of the diffusate.

21. The process of claim 20, wherein the stream of zirconium oxychloride and the stream of one of water and an aqueous solution move in counter-current flow.

22. The process of claim 1, wherein dialyzing the zirconium oxychloride solution comprises passing a stream of the zirconium oxychloride through an anion exchange membrane stack comprising a plurality of individual anion exchange membranes.

23. The process of claim 1, wherein dialyzing the zirconium oxychloride solution comprises dialyzing across the at least one anion exchange membrane at a rate in the range of from 2.5 up to 4.5 liters of dialyzate per square meter of membrane per hour.

24. The process of claim 1, wherein the sum of the concentrations of $ZrO_2$ and $HfO_2$ in the zirconium oxychloride solution is in the range of from 30 up to 350 grams/liter.

25. The process of claim 1, wherein the ratio of total acidity and the sum of the concentrations of $ZrO_2$ and $HfO_2$ in the dialyzate is in the range of from 2.2 up to 3.2.

26. The process of claim 1, wherein the dialyzate includes at least 99.8 percent of the zirconium ions in the zirconium oxychloride solution.

27. The process of claim 14, further comprising:

filtering and washing the reaction mixture of dialyzate and at least one of sulfuric acid and a sulfuric acid solution to recover a paste or moist cake composed predominantly of zirconium basic sulfate.

28. The process of claim 1, wherein the rate of production of dialyzate having $TA/MO_2$ of from 2.2 up to 3.2 is from 2.5 up to 4.5 liters of dialyzate per square meter of membrane area per hour, and further wherein $TA/MO_2$ is the ratio of total acidity and the sum of the concentrations of $ZrO_2$ and $HfO_2$ in the dialyzate.

29. A process for producing a zirconium basic sulfate, the process comprising:

recovering a solid zirconium tetrachloride from a zirconium-containing material;

dissolving the solid zirconium tetrachloride in a material selected from the group consisting of water and a hydrochloric acid solution to provide a zirconium oxychloride solution;

dialyzing the zirconium oxychloride solution against water across an anion exchange membrane to provide a dialyzate and a diffusate, the dialyzate including at least 90 percent of the zirconium ions of the zirconium oxychloride solution, the total acidity of the diffusate being greater than the water; and mixing at least a portion of the dialyzate with one of sulfuric acid and a sulfuric acid solution and heating the resulting mixture to form a precipitate including solid zirconium basic sulfate.

30. The process of claim 29, wherein the zirconium-containing material is at least one material selected from the group consisting of zircon, baddeleyite, an oxide material including zirconium, zirconium metal, and a material including zirconium metal.

31. The process of claim 29, wherein dialyzing the zirconium oxychloride solution comprises:

dialyzing a stream of the zirconium oxychloride solution against a stream of water across the anionic exchange membrane, the stream zirconium oxychloride being converted by dialysis to a dialyzate stream, and the stream of water being converted by dialysis to a diffusate stream; and separately collecting the dialyzate stream and the diffusate stream.

32. The process of claim 31, wherein dialyzing the zirconium oxychloride stream produces a dialyzate having a $TA/MO_2$ within the range of from 2.2 up to 3.2 at a rate of from 2.5 up to 4.5 liters of dialyzate per square meter of membrane area per hour, and further wherein $TA/MO_2$ is the ratio of total acidity and the sum of the concentrations of $ZrO_2$ and $HfO_2$ in the dialyzate.

33. The process of claim 29, wherein the sum of the concentrations of $ZrO_2$ and $HfO_2$ in the zirconium oxychloride solution is in the range of from 30 up to 350 grams/liter.

34. The process of claim 29, wherein the ratio of total acidity and the sum of the concentrations of $ZrO_2$ and $HfO_2$ in the dialyzate is in the range of from 2.2 up to 3.2.

35. The process of claim 9, wherein the chlorinating agent is at least one material selected from the group consisting of chlorine gas, carbon tetrachloride, phosgene, and a chlorinated hydrocarbon.

* * * * *